United States Patent [19]

Namikawa et al.

[11] Patent Number: 4,849,618

[45] Date of Patent: Jul. 18, 1989

[54] MAGNETIC MEDIUM FOR MAGNETIC EMBOSSMENT AND MAGNETIC CARD USING THE SAME

[75] Inventors: Mamoru Namikawa, Tokyo; Yoshiaki Makino, Yokohama; Hiroaki Himori, Tokyo; Genichi Kagai, Sagamihara; Hiroshi Kamio, Tokyo, all of Japan

[73] Assignee: Tokyo Magnetic Printing Company Ltd., Tokyo, Japan

[21] Appl. No.: 856,581

[22] Filed: Apr. 25, 1986

[30] Foreign Application Priority Data

Apr. 26, 1985 [JP] Japan ................................. 60-90461

[51] Int. Cl.$^4$ ...................... G06K 19/02; G06K 19/08
[52] U.S. Cl. .................................... 235/493; 235/490; 235/488; 235/487; 283/904
[58] Field of Search .................... 283/94, 904; 101/DIG. 18; 235/448, 449, 450, 488, 487, 490, 493, 489; 360/134

[56] References Cited

U.S. PATENT DOCUMENTS

| | | | |
|---|---|---|---|
| 3,676,644 | 7/1972 | Vaccaro et al. | 235/493 |
| 3,860,796 | 1/1975 | Wallace et al. | 235/488 |
| 3,874,586 | 4/1975 | Foote et al. | 235/449 |
| 3,922,430 | 11/1975 | Mayer | 283/904 |
| 4,090,662 | 5/1978 | Fayling | 235/493 |
| 4,132,350 | 1/1979 | Kubota et al. | 235/493 |
| 4,215,812 | 8/1980 | Chancel | 235/493 |
| 4,315,145 | 2/1982 | Nishikawa et al. | 235/493 |
| 4,410,583 | 10/1983 | Hanaoka | 360/134 |
| 4,507,550 | 3/1985 | Fleer | 235/487 |
| 4,639,815 | 1/1987 | Arai et al. | 360/134 |

FOREIGN PATENT DOCUMENTS 54-11107   5/1979   Japan.
57-117129  7/1982   Japan.

Primary Examiner—Aristotelis M. Psitos
Assistant Examiner—Robert A. Weinhardt
Attorney, Agent, or Firm—Victor Flores; Harry M. Weiss

[57] ABSTRACT

A magnetic medium for magnetic embossment comprises a main magnetic layer and a high permeability magnetic-metal layer, a nonmagnetic white metal layer and a coloring layer laminated on the main magnetic layer.

A magnetic card comprises a card substrate which is nonmagnetic, and a magnetic medium for magnetic embossment disposed on at least a part of the card substrate, which magnetic medium comprises a main magnetic layer and a high permeability magnetic-metal layer, a nonmagnetic white metal layer and a coloring layer laminated on the main magnetic layer.

3 Claims, 5 Drawing Sheets

MAGNETIC MEDIUM FOR MAGNETIC EMBOSSMENT AND MAGNETIC CARD USING THE SAME

BACKGROUND OF THE INVENTION

1. Field of the Invention

The present invention relates to a magnetic medium for magnetic embossment (characters in relief) and a magnetic card using the same, which are employed for identification, credit, cashless systems, POS etc.

2. Description of the Prior Art

Conventional embossed cards are such that the name of an owner (user), owner No., publication No., account No., the term of validity, etc. in the form of embossment characters visible to the eye are embossed on the basis of a predetermined format at a part or predetermined position of the card. When the card is used, a chit or slip is imprinted with the characters by the use of carbon or non-carbon paper by means of an imprinter at a dealer so as to draw up a document as visible evidence of transaction containing the visible characters or patterns, whereby the cards serve the conveniences of monetary facilites, POS users or the card users.

As regards the aforementioned embossed cards, however, the illicit uses of the cards based on forgery, falsification etc. are increasing because (1) a hard polyvinyl chloride sheet, which is commercially available, is used as a substrate material, and (2) embossors (devices for embossment) are also widespread.

As expedients for solving such problems, forgery preventive techniques based on magnetic embossment as disclosed in the official gazette of Japanese Patent Application Laid-Open No. 57-117129, the official gazette of Japanese Patent Application Publication No. 54-11107, etc. have been developed.

The method in the official gazette of Japanese Patent Application Laid-Open No. 57-117129, however, employes a thick magnetic layer having a thickness of 0.4–0.5 mm, so that in case of applying it to, for example, any of cards having total thicknesses of 0.7–0.8 mm now in use, a recess needs to be provided in a center core or the like beforehand, which has led to a high cost in production. Further, no means for concealing the color tone of the magnetic layer is provided, so that even when color layers are formed on the front and rear sides of the strip of the magnetic layer which is elongate by way of example, the ranges of choice of the color tones of the color layers have been limited (when the color layer is thin in a light color or bright color, the color of the main magnetic layer remains visible). Moreover, since the magnetic layer is as thick as 0.4–0.5 mm, this magnetic layer portion cannot be used as a signal recording portion which is formed by a conventional magnetic recording system. Furthermore, since the prior-art magnetic-embossment magnetic medium has only the magnetic layer of high coercive force exhibiting a low permeability, it is difficult to endow the medium with a function for checking forgery, alteration etc.

On the other hand, a device for reading magnetic cards disclosed in the official gazette of Japanese Patent Application Publication No. 54-11107 uses a card similar to that disclosed in the official gazette of Japanese Patent Application Laid-Open No. 57-117129 and it reads the embossment characters of the magnetic card which have been formed by developing magnetization owing to the reverse effect of magnetostriction. This measure is not satisfactory for checking forgery and alteration, and the effect of preventing the forgery and alteration is insufficient. It is also impossible to employ the conventional magnetic recording system.

An object of the present invention is to provide a magnetic medium for magnetic embossment and a magnetic card which can eliminate the problems of the prior art as stated above.

SUMMARY OF THE INVENTION

According to an aspect of the present invention, there is provided a magnetic medium for magnetic embossment characterized in that a high permeability magnetic-metal layer, a monmagnetic white metal layer and a coloring layer are laminated on a main magnetic layer.

According to another aspect of the present invention, there is provided a magnetic card characterized in that a magnetic medium for magnetic embossment in which a high permeability magnetic-metal layer, a nonmagnetic white metal layer and a coloring layer are laminated on a main magnetic layer is disposed on at least a part of a card substrate which is nonmagnetic.

This invention will now be described in further detail with regard to preferred embodiments as illustrated in the accompanying drawings.

BRIEF DESCRIPTION OF THE DRAWINGS

FIG. 8 consisting of (A)–(E), is a view for explaining an example of a method of manufacturing the magnetic card of the present invention;

DESCRIPTION OF THE PREFERRED EMBODIMENTS

Figure 1:
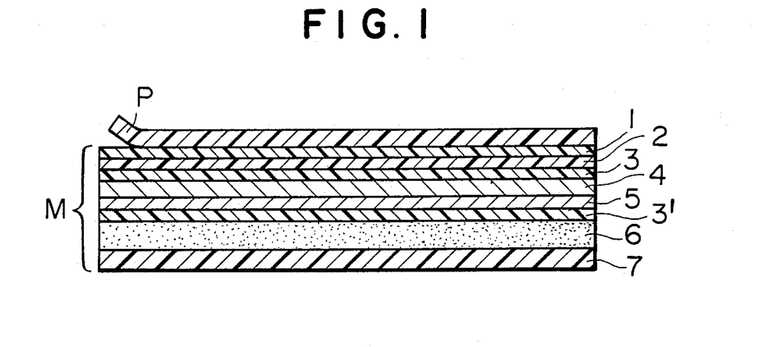
FIG. 1 is a schematic view showing a sectional structure of a magnetic medium for magnetic embossment which is an embodiment of the present invention.

FIG. 1 schematically shows the sectional structure of a magnetic medium for magnetic embossment which is an embodiment of the present invention. The magnetic medium for magnetic embossment M of this embodiment is formed as stated below. First, on a polyethylene terephthalate stripping base P which is about 20 μm thick, a top coat 1 is formed which is made from a polyurethane resin and an acetate resin with a small amount of hardenable silicone oil mixed therein (for mold releasing) and which is about 1 μm thick. The top coat layer 1 serves to enhance the wearability of a coloring layer against a head after the finish of the magnetic medium. The small amount of silicone oil is mixed in the top coat layer 1 to facilitate the later stripping of the base P. The coloring layer 2 is formed next the top coat 1. This coloring layer 2 is formed in such a way that, using a binder which principally contains a polyamide type resin, an ink in which a fluorescent pigment or an organic fluorescent dye is dispersed in a white pigment principally containing $TiO_2$ is applied to a thickness of about 2 μm by reverse rolling, gravure coating, doctor coating or the like, and that the applied coating is dried. The coloring layer 2 should preferably be as thin as possible because a space loss can be reduced in case of performing analog or digital recording with an ordinary magnetic head. Protective layers, a magnetic layer etc. to be described later can also be formed by applying the coating methods. According to a purpose, the fluorescent pigment to be used is selected from among, for example, 'LUMOGEN L YELLOW' (yellow) and 'LUMOGEN L BLUE' manufactured by A. G., and the organic fluorescent dye is selected from among, for example, 'FULUURECEINE' manufactured by BASF, 'EOSINE' manufactured by J. R. GEIGY S. A., 'EOSINE GF' and 'EOSINE LAKE' manufactured by Sumitomo Kagaku (NSK), 'BRONZE CARMINE 5219' manufactured by British ICI Ltd., and 'IRGALITE BRONZE RED CL' manufactured by Swiss Geigy Ltd. The protective layer 3 is formed next the coloring layer 2. The protective layer 3 is formed in such a way that a resin having damp-proof, acid-proof and alkali-proof properties and exhibiting close adhesion to both the coloring layer 2 and a white metal evaporated layer 4 to be described below, for example a vinyl chloride-vinylidene chloride copolymer resin is applied to a thickness of 0.5–1 μm. Subsequently Al which is a nonmagnetic white metal is uniformly evaporated on the protective layer 3 to a thickness of 0.05–0.1 μm, to form the white metal thin-film layer 4. An Ni alloy which has a high permeability and a corrosion resistance higher than that of Al is evaporated on the white metal thin-film layer 4 to a thickness of about 100–2000 Å, to form a high permeability metal thin-film layer 5. As the magnetic property of this layer, a composition close to 78 Permalloy can assume $\mu a$ of about 8000 at the maximum. In this case, when a magnetic field is applied in the lengthwise direction to the layer during the evaporation, $\mu a$ can be enhanced or controlled by the effect of evaporation within a magnetic field. The high permeability metal thin-film layer 5 may well be formed from only Ni, and $\mu a$ of about 100–200 is attained in this case. Besides, a high permeability amorphous-alloy thin film (for example, $Fe_{78}B_{13}Si_9$, $\mu a$: 5000) is useful.

Next, the protective layer 3', which is 0.5–1μ thick, is formed on the high permeability metal thin-film layer 5. The protective layer 3' is made from a vinyl chloride-vinyl acetate copolymer resin which has damp-proof, acid-proof and alkali-proof properties and which exhibits a good adhesion to both the high permeability metal thin-film layer and the main magnetic layer 6 to be stated below. When the magnetic medium is used in its final form, this protective layer serves to prevent the remaining acid of a magnetic substance or a salt in the main magnetic layer 6 to-be-stated-below from being activated by moisture in the air and corroding the thin metal film 5.

Subsequently, the main magnetic layer 6 is formed on the protective layer 3'. This magnetic layer 6 is formed to a thickness of about 10 μm after drying a magnetic coating material whose principal ingredient is Co-adsorped $\gamma$-$Fe_2O_3$. By way of example, the magnetic coating material is prepared by kneading 850 gr. of needle magnetic substance Co-adsorped-$\gamma$-$Fe_2O_3$ (Hc: 650 Oe.) having a mean axial length of 0.5 μm, 180 gr. of toluene, 650 gr. of MEK, 3 gr. of dibutyl phthalate, 210 gr. of polyurethane resin, 420 gr. of tetrahydrofuran, and 17 gr. of silicone oil.

Figure 12A:
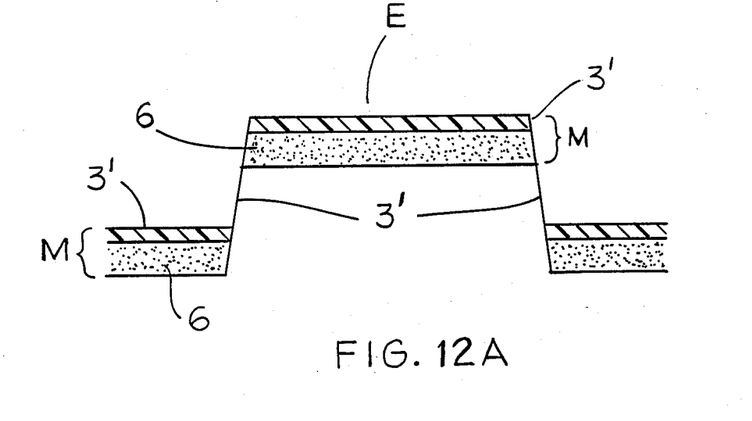
FIGS. 12(A) and 12(B) illustrate a protrusion having the main magnetic layer ruptured all around the protrusion during the embossing opertion and being separated from the nonembossed portion to enable a higher concentration of magnetic flux.
Figure 12B:
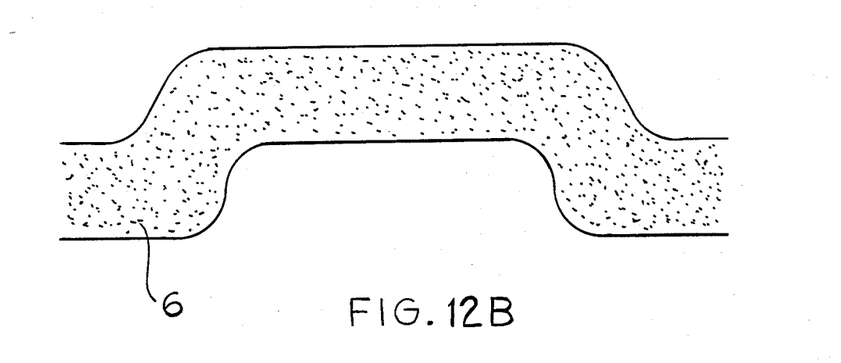

Referring to FIG. 12, the thickness of the main magnetic layer 6 is an important factor in this magnetic medium for magnetic embossment. When this thickness is too great, as in FIG. 12(B), the magnetic medium becomes unsuited to signal recording and reproduction by the conventional magnetic head for recording analog or digital signals, likewise to the prior-art magnetic medium for magnetic embossment. In addition, the main magnetic layer 6 should preferably be thin to some extent for the reason that, when the magnetic medium for magnetic embossment as shown in FIG. 12(A), is subjected to embossing, the main magnetic layer 6 ruptures at the ends of resulting protrusions E, to form discontinuous parts and to raise the degree of the concentration of magnetic fluxes on the protrusions, so the magnetic data of the embossed portion of the magnetic medium can be read more simply and accurately. It is accordingly preferable that the thickness of the main magnetic layer 6 is in a range of 3–20 μm.

Subsequently, a thermosensitive adhesive 7 (for example, 'P-99 Adhesive', Toyo Inki) is deposited on the main magnetic layer 6 to a thickness of 10 μm. The adhesive 7 may be of a vinyl chloride type, an acryl type or a rubber type usually known to those engaged in the art, or of a mixture thereof.

Even when the protective layers 3 and 3' are not provided, the effects of the present invention can be attained.

Next, embodiments of the magnetic card of the present invention using such a magnetic medium for magnetic embossment will be described.

Magnetic cards having portions of embossment (relief characters or stamped characters) have come into wide use as credit cards etc. The card of this type bears the name of an individual, No. of the user and the term of validity in the form of the embossment characters. It is well known that the embossed portion is turned into visible characters or patterns on a chit by the use of an imprinter, to prepare one document of evidence or slip which can be kept in custody, whereby the cards serve the conveniences of various monetary facilities, POS users and card users. In this manner, with the prior-art embossment system, merely the embossed portion can be read out as the visible information, and it has been difficult to detect the transfer of the information as an electrical signal. Moreover, a substrate for the credit card is a hard polyvinyl chloride lamination sheet having a total thickness of about 0.7 mm, which is generally used and which is available comparatively easily even by a person outside card manufactures and card issuers.

Furthermore, embossors themselves are widespread, and an embossed card can be forged rather easily, so it can be seen that security problems are latent.

Figure 2:
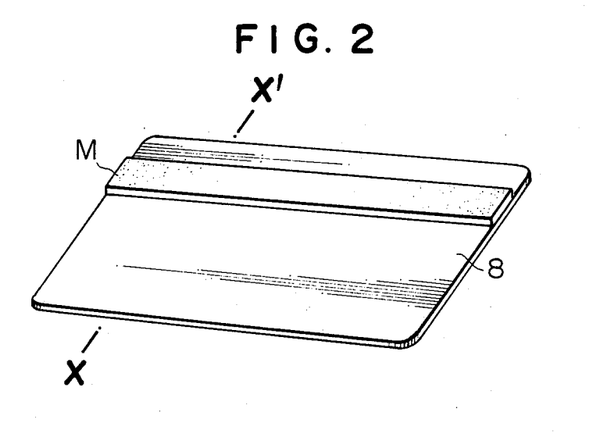
FIG. 2 is a perspective view of a magnetic card which uses the magnetic medium for magnetic embossment in FIG. 1.
Figure 3:
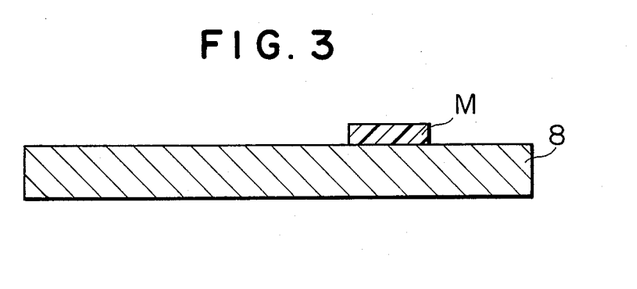
FIG. 3 is a sectional view taken along line X—X' in FIG. 2.

When applied to the embossed portion of such an embossed magnetic card, the magnetic medium for magnetic embossment according to the present invention as described above can cope with such difficulties and uneasiness. FIG. 2 shows in perspective a magnetic card in which the magnetic medium for magnetic embossment M in FIG. 1 is stuck to a part of a card substrate 8 which is nonmagnetic. FIG. 3 is a sectional view taken along line X—X' in FIG. 2.

Figure 4:
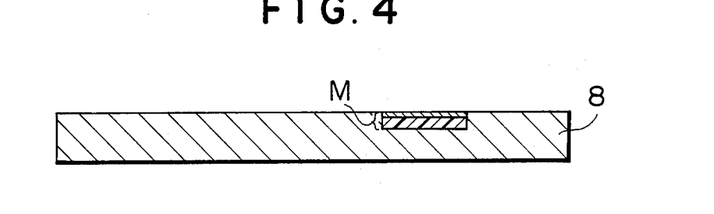
FIG. 4 is a sectional view showing a magnetic card according to a different embodiment of the present invention.
Figure 5:
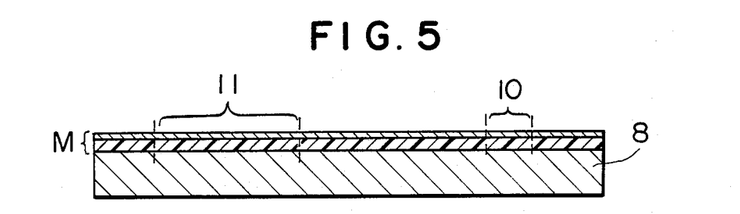
FIG. 5 is a sectional view showing a magnetic card according to another preferred embodiment of the present invention.

FIG. 4 shows a sectional view in the case where the magnetic medium M is buried in a card substrate 8 and where the front surfaces thereof are made even. FIG. 5 shows a magnetic card in which the magnetic medium for magnetic embossment M according to the present invention is formed on the whole front surface of a substrate 8 and in which a part indicated by reference numeral 10 is used as a signal recording portion, while a part indicated by reference numeral 11 is used as an embossment portion.

Figure 6:
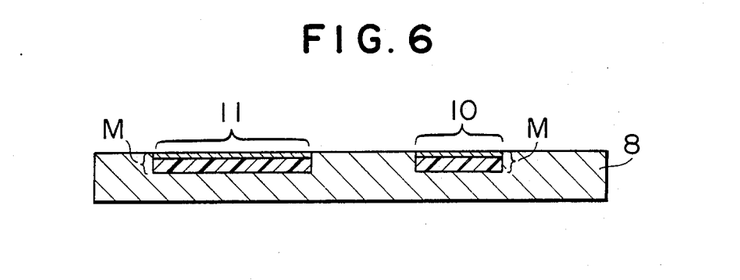
FIG. 6 is a sectional view showing a magnetic card according to another preferred embodiment of the present invention.

Shown in FIG. 6 is the section of a card in which a magnetic signal recording portion 10 and an embossment portion 11 are formed in a card substrate 8 by the use of a separate magnetic media M. With this measure, when a magnetic recording portion 10 of which have different color tones is to be manufactured, the card of favorite design can be fabricated comparatively easily by employing stripe-shaped magnetic media of the different colors in advance. The blank space of the magnetic embossment portion 11 may well be utilized as an analog or digital signal recording portion.

Figure 7:
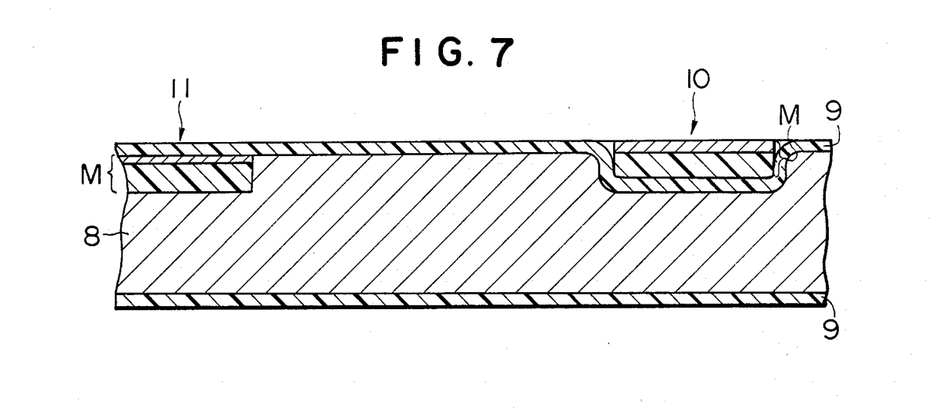
FIG. 7 is a sectional view showing a magnetic card according to another preferred embodiment of the present invention.

FIG. 7 shows the section of a magnetic card with magnetic embossment which is more durable in practical use, as still another embodiment of the present invention. In general, a credit card, a magnetic card, etc. have a structure wherein predetermined displays are printed on the surfaces (both the front and rear surfaces) of a white center core about 0.5 mm thick, and transparent hard polyvinyl chloride acetate copolymer films 0.1 mm thick are stuck thereon by thermocompression, thereby to prevent the contamination, wear etc. of the display print surfaces during use. Although the structures as shown in FIGS. 5 and 6 are also practicable, the embossed portion should desirably be situated under an ovelay if possible because the embossment characters are frequently depressed through the paper of the slip by the imprinter as stated before. This measure is also advantageous for preventing forgery and falsification. An embodiment in FIG. 7 is an example of such a structure of the magnetic card. The magnetic medium M of a signal recording portion 10 is worked to be even with the front surface of the card on one of overlays 9 which sandwich a card substrate 8 therebetween, whereas the magnetic medium M of an embossed portion 11 is disposed under the overlay 9.

Next, concrete examples of manufacture of a magnetic embossment portion and a magnetic signal recording portion according to the present invention will be described.

CONCRETE EXAMPLE I

A method of manufacturing the magnetic card of the structure as shown in FIG. 7 is as described below.

Figures 8A, 8B, 8C, 8D, 8E:
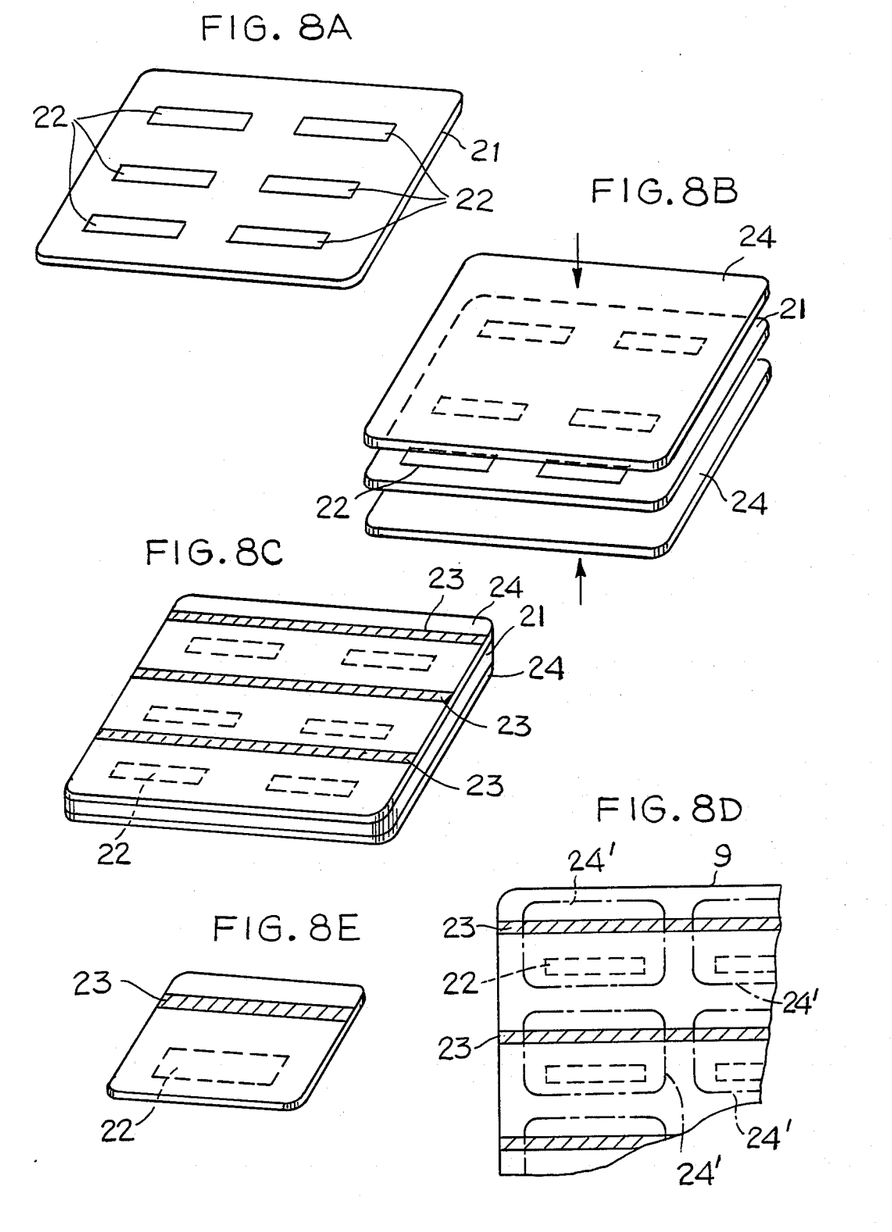

(1) First, as shown in FIG. 8(A), a plurality of magnetic media for embossment 22 as stated before are bonded on a center core member 21 having a thickness of about 0.5 mm.

(2) Subsequently, as shown in FIG. 8(B), transparent overlay members 24 each having a thickness of about 0.1 mm are placed on both the surfaces of the center core member 21 and are temporarily fixed (an adhesive may well be used).

(3) Subsequently, as shown in FIG. 8(C), magnetic stripes 23 for magnetic signal recording are stuck to the predetermined positions of the surface of the overlay 24.

(4) At the next step, the overlay members 24 are heated and pressed in such a way that both their sides are held between metallic heating plates whose surfaces are substantially flat and mirror-finished. Thus, the magnetic media for embossment 22 are made even with the outer surface of the center core member 21, while the magnetic stripes for signals 23 are made even with the outer surface of the overlay 24. In case of employing a hard polyvinyl chloride acetate copolymer for the center core member 21, the laminated structure may be heated and pressed at 150° C. and under 40 kg/cm$^2$ for about 60 minutes and thereafter cooled to or near the normal temperature under the pressed condition, whereupon the pressing plates may be released.

(5) Lastly, as shown in FIG. 8(D), the resultant structure is punched into predetermined external dimensions of the cards along dot-and-dash lines indicated by reference numerals 24', whereby the final magnetic cards each being as shown in FIG. 8(E) are fabricated.

CONCRETE EXAMPLE II

Figure 9A:
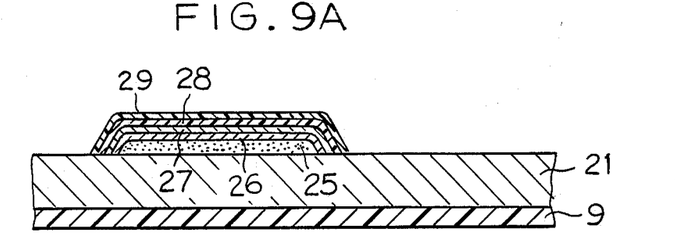
FIGS. 9A and 9B are views for explaining another example of the method of manufacturing the magnetic card of the present invention.

An example of a method of forming a magnetic embossment portion in accordance with a screen printing process is as follows:

(1) As shown in a sectional view of FIG. 9(A), an overlay 9 is formed on one surface of a center core 21 beforehand, and a magnetic ink is applied to the predetermined position of the opposite surface to a thickness (after drying) of about 3–20 μm by the screen printing process, to form a main magnetic layer 25. At this time, screen meshes are 200, and an example of the composition of the printing ink is as listed below.

γ-Fe$_2$O$_3$ needle powder (Hc: 300 Oe.): 200 gr.
Resin binder (trade name, VINYLITE-VYHH): 120 gr.
Dioctyl phthalate: 30 gr.
Dimethyl cyclohexanone: 130 gr.
Cyclohexanone: 50 gr.
These ingredients are uniformly mixed and dispersed by a roll mill or the like.

(2) An Ni thin film is first formed on the main magnetic layer 25 by evaporation to a thickness of about 200 Å as a high permeability metal thin-film layer 26, and an Al thin film is subsequently formed thereon by evaporation to a thickness of about 500 Å as a white metal thin-film layer 27.

(3) After the above step (2), if necessary, a protective layer 28 whose principal ingredient is a polyurethane resin is formed on the evaporated film 27 to a thickness of about 1 μm (after drying) by gravure printing, screen printing, doctor coating or the like. The protective layer may extend on the whole surface of the center core 21, or may well extend in a range in which the evaporated layer 27 is concealed.

(4) Subsequently, a predetermined coloring layer 29 is formed on the evaporated layer 27 (on the protective layer 28 when this protective layer 28 has been provided) by screen printing. It is preferable that the coloring layer is as thin as possible.

Figure 9B:
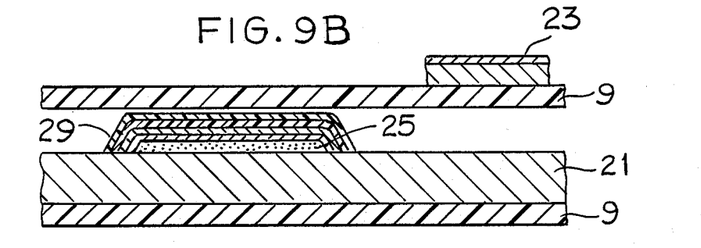

(5) Subsequently, as shown in FIG. 9(B), another overlay 9 is placed on the resultant structure, a magnetic stripe for signals 23 is further attached to a predetermined position on this overlay 9, and a desired card configuration is obtained by taking steps similar to the steps (4) et seq. of the preceding concrete example I.

Next, the reading of the magnetic embossment, check on the presence of the magnetic layer, transmission etc. for the colored magnetic embossment card stated before will be described with reference to FIGS. 10 and 11.

Figure 10:
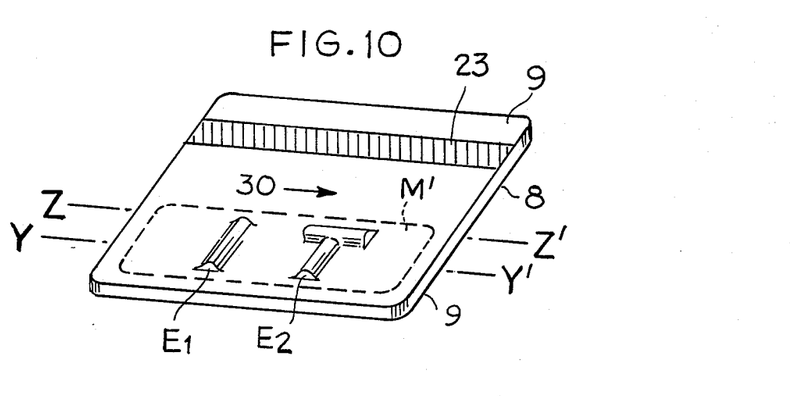
FIG. 10 is a plan view of a magnetic card according to the present invention.

In FIG. 10, reference numeral 8 indicates a card substrate, in which a colored magnetic embossment portion is formed in a part M′ enclosed with a dotted line. Now, letters I and T are formed as embossment characters. A permanent magnet or electromagnet is brought close to the embossment characters from above, or it is moved in a direction Y—Y′ in FIG. 10, to magnetize the magnetic substance. If possible, the magnetic substance itself should desirably be saturatedly magnetized. This serves to increase to the utmost the number of the lines of magnetic forces extending from the magnetic embossment character and to raise a detected output by a sensor. Conveniently, the embossment character is not deformed by an external stress arising when the card is carried in the ordinary daily life or when it is used, and hence, the magnetic embossment character can be regarded as a permanent fixed pattern. Therefore, even when the magnetization established as stated above is erased for any reason it can be reproduced by magnetizing the material of the magnetic embossment again with the permanent magnet or electromagnet.

There will be explained as to the case where a magnetic embossment character $E_1$ is I and $E_2$ is T in FIGS. 10 and 11.

Now a reading magnetic head in which the gap positions of 2 channels are deemed to lie on an identical line (a ring type head which has magnetic head gaps of, for example, 100 $\mu$ or above) is moved along an arrow 30 in directions Y—Y′ and Z—Z′. At this time, it is effective in a practical machine that a permanent magnet is set in the preceding stage of the reading head so as to permit the colored embossment characters to be saturatedly magnetized immediately before the reading. The permanent magnet may preferably have an end-face field intensity of about 1600 Oe when the main magnetic layer (corresponding to the main magnetic layer 6 or to the main magnetic layer 25 in FIG. 9) of the magnetic embossment has a coercive force of 650 Oe.

Figure 11:
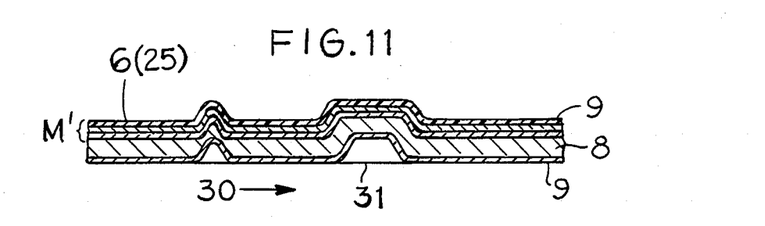
FIG. 11 is a sectional view of a magnetic card according to the present invention.

FIG. 11 shows a part of a section taken in the direction Z—Z′ in FIG. 10. As seem from the illustration, when the gap plane of the reading head scans a line Z—Z′ in FIG. 10 (as close to the upper plane of the embossment characters as possible, or in touch with the upper plane), the spacings from the plane of the part of the magnetic substance layer 6 or 25 corresponding to the upper plane of the embossment and the plane of the other part thereof to the head gap are unequal, and hence, the output voltages of the reading head are naturally unequal between the parts. That is, as the reading head gap is closer to the magnetic substance layer, the output becomes greater.

Further, as seen from FIG. 10, when the line Z—Z′ and the line Y—Y′ are simultaneously scanned by two reading heads (or a multichannel head) as to I and T, the touching period of time of the head at the lateral bar of T on the line Z—Z′ is longer than that of the other head at the vertical leg of T on the line Y—Y, and the output voltages of the heads develop at different positions for unequal periods of time. It is therefore possible to discriminate the letters. Although the head of 2 channels has been referred to in this example, Roman characters etc. can be readily identified when a multichannel head is used.

Although, in the description, the convex plane of the embossment characters has been scanned by the magnetic head, the characters can be readily identified owing to a phenomenon reverse to the above even when the opposite plane 31 (refer to FIG. 11) is scanned by the head.

The foregoing is a method in which a magnetic sensor is used to detect the presence of the colored magnetic embossment character and to identify the character.

As another simple magnetic checking metod, one example will be explained. The presence of the magnetism of a magnetized and colored magnetic embossment character can be checked by the use of a magnetic tape viewer manufactured by 3M Inc. When the magnetic tape viewer is arranged on a magnetic card, the magnetic embossment character magnetized is clearly displayed as the pattern of a magnetic colloid on the display portion of the magnetic tape viewer.

In addition, regarding the detection of the high permeability metal thin-film layer 5 or 26 in the magnetic embossment portion, it is the simplest to observe the inductance variation of a coil (air-core or cored). Since such techniques are employed commonly in a proximity switch etc., they shall not be described in detail here.

As stated above, according to the present invention, a magnetic substance is laid in the embossment working portion of a card substrate so as to be visible to the eye or difficult of vision from the front surface of a card, and it is embossed by the same method as in the prior art, whereby the embossment characters etc. are magnetically rendered visible or are magnetically read. Further, it becomes possible to transmit the signals of the characters etc. to, for example, a central data file (computer) in a remote place by means of a device for conversion from magnetic signals into electric signals, and to perform bidirectional communications etc.

Besides, the magnetic medium for magnetic embossment according to the present invention is also capable of writing and reading magnetic signals on the basis of the conventional magnetic recording system.

Further, the magnetic medium for magnetic embossment according to the present invention is provided with a coloring layer on a magnetic layer through a white nonmagnetic metal thin film for completely concealing the color of the main magnetic layer, so that the magnetic medium can make it difficult to find the presence of the magnetic substance when applied to an object in the shape of a card or a sheet.

Furthermore, the magnetic medium for magnetic embossment according to the present invention allows a coloring layer to contain an ultraviolet radiation-sensitive material. In this case, it luminesces under ultraviolet radiation and can increase the effect of preventing the forgery and alteration of cards etc.

Furthermore, in the present invention, when a metal thin film having a high permeability and greater corrosion resistance than Aluminum, for example a thin film of Ni, permalloy (Fe-Ni) or any of high permeability amorphous alloys (for example, an Fe-B-Si alloy and an Fe-Co-B-Si alloy) is formed between a nonmagnetic metal thin film and a main magnetic layer, and the main magnetic layer is made of, for example, any of powdery oxide type magnetic materials ($\gamma$-$Fe_2O_3$, $Fe_3O_4$, Co-adsorped or -doped $\gamma$-$Fe_2O_3$ and $Fe_3O_4$, Ba-ferrites, Co-ferrites, etc.) or Fe or Fe-Co alloy powder, a protective layer is provided, whereby the Al film can be prevented from being corroded by very slight amounts of remaining acids contained in the material of the main magnetic layer, the color tone of a coloring layer can be kept, and contamination etc. ascribable to a corroded spot can be prevented from occurring.

Furthermore, since a high permeability layer exists in the embossed portion of a magnetic card according to the present invention, a system for checking the presence or absence of the layer with, for example, the sensor of a card terminal device is constructed, and the effect of preventing forgery and alteration can be expanded.

Next, concerning the effects of the present invention mentioned above, especially merits not included in the prior art in an application to a magnetic embossment card will be described below.

(1) Since magnetic reading is possible, a magnetic signal is converted into an electric signal or optical signal by the use of a magnetic sensor (for example, MR head, Hall device, ring type head, coil or any other magnetic induction sensor), and the electric or optical signal can be transmitted to a remote place by a transmission line or the like. In addition, the card can be checked using a simple magnetic checker such as magnetic tape viewer, and a security check not attainable with a prior-art embossment card is possible.

(2) Since a high permeability material is added, a security check becomes possible in such a way that the presence of the material is detected by the magnetic sensor described in the preceding item (1).

(3) Since there is a coloring layer on the front side of the card, the color tone thereof can also be made substantially the same as the color of the substrate of the card, and by designing the layer freely, a magnetic layer can be rendered almost invisible to the eye.

(4) The colored magnetic embossment layer is situated under an overlay as stated before, whereby the foregoing effect of preventing forgery and falsification can be more completed.

(5) An ultraviolet radiation-sensitive pigment or dye is further added in a color paint or color ink which forms the coloring layer, whereby the card luminesces under an ultraviolet light emission device (the card hardly luminesces under ordinary light), and this serves as one method of security check.

(6) As stated before, according to the present invention, the main magnetic layer of a magnetic medium for magnetic embossment is thinned to some extend. Thus, in an embossing operation, the main magnetic layer ruptures at the ends of a protrusion, to form discontinuous parts, which raise the degree of concentration of magnetic fluxed on the protrusion. Therefore, the magnetic reading of the embossed part can be performed more simply and accurately.

As set forth above, according to the present invention, the colored magnetic embossment layer is permitted to include security check functions not attainable with the prior-art card, covering the six items of (1) the check of the embossment, (2) the check based on the coloring layer and the design thereof, (3) the check on the presence of the magnetic embossment, (4) the check of comparison with an original file (magnetic embossment signals are recorded and stored in a computer memory) based on the reading of the magnetic embossment, (5) the check on the presence of the high permeability material, and (6) the check on whether or not the ultraviolet radiation-sensitive pigment is contained, and the invention is greatly effective to make the forgery and falsification of the card very difficult.

What is claimed is:

1. an embossed magnetic card, comprising: a non-magnetic card substrate, a magnetic medium for magnetic embossment disposed on at least a portion of said non-magnetic card substrate, said magnetic medium further comprising a main magnetic layer and a high permeability magnetic-metal layer laminated thereupon, said main magnetic layer having a thickness within the range of about 2 to about 20 um, and said high permeability magnetic-metal layer having a thickness within a range of about 100 to about 2000 A, said magnetic medium having embossed protrusions, said main magnetic layer being substantially ruptured all around said protrusions to enable a higher magnetic flux concentration at said protrusions.

2. A magnetic card as defined in claim 1, wherein an analog or digital signal recording portion is provided separately from said magnetic medium for magnetic embossment.

3. A magnetic card as defined in claim 1, wherein a synthetic-resin protective layer is interdisposed between said main magnetic layer and said high permeability magnetic-metal layer.

* * * * *